Patented July 13, 1937

2,086,581

UNITED STATES PATENT OFFICE 2,086,581

METHOD FOR PRODUCING BITUMINOUS PAVING MIXTURES AND PRODUCT THEREOF

Preston R. Smith, Rahway, N. J., assignor, by mesne assignments, to The Barber Company, Inc., Philadelphia, Pa., a corporation of New Jersey No Drawing. Application July 10, 1933, Serial No. 679,720. In Sweden July 7, 1933

10 Claims. (Cl. 106—31)

This invention relates to a method for producing bituminous paving mixtures and product thereof.

The method in accordance with this invention comprises generally speaking the admixture of an aggregate with a soft bitumen in the presence of a solvent for the soft bitumen in order to effect a coating of the aggregate and finally dispersing a hard bitumen throughout the mass. More specifically, the method in accordance with this invention involves the admixture of a soft bitumen emulsified in water with an aggregate in the presence of a volatile solvent for the soft bitumen and finally dispersing a hard bitumen throughout the mass. The method in accordance with this invention will be carried out entirely in the cold; that is to say, the admixture of the aggregate with a soft bitumen and the dispersion of a hard bitumen throughout the mass will be effected without the use of heat.

The product in accordance with this invention will comprise an aggregate coated with a soft bitumen cut back or reduced in viscosity by a volatile solvent for the soft bitumen and, dispersed throughout the mass, water from the emulsion originally admixed with the aggregate and a hard bitumen. If desired the product may also include a filler.

The product will be of a granular, friable nature and will be especially adaptable for use in road building, road surfacing etc. and will be adapted for laying in the cold. The product will be characterized especially by the fact that it will retain its granular, friable nature for relatively long periods, thus enabling it to be stored and transported, and readily distributed and levelled in the process of laying. The product will retain its granular, friable nature for relatively long periods due to the fact that the soft bitumen, even though cut back with a volatile solvent, will only slowly flux the hard bitumen, and especially in the presence of the water dispersed throughout the mass. Further, the presence of the volatile solvent in the mass will tend to prevent any hardening of the soft bitumen.

On the other hand, when the mix is laid in place and consolidated, as by rolling, tamping, or the like, the water and solvent for the soft bitumen will rapidly leave the mass by evaporation and the soft bitumen will relatively rapidly flux the hard bitumen with the production of a durable and wear resisting binder for the aggregate.

In carrying out the method in accordance with this invention any suitable aggregate or mixture of aggregates of varying sizes may be used. Either bituminous or non-bituminous aggregates may be used. Thus, for example, the aggregate may comprise a natural bituminous sandstone, limestone, bank sand, river sand, gravel, trap rock, and fillers such as limestone dust, silica dust, Portland cement, or mixtures thereof, or any type of bituminous or non-bituminous rock or mixtures thereof. The aggregate may be of any desired particle size and may include particles of different size in any desired proportion. Preferably, the aggregate will be of relatively small particle size, and any particular type of aggregate where necessary may be reduced to desired size by grinding or crushing. It will be understood that this invention from the standpoint of method and product, is not dependent upon the use of any particular aggregate or any particular particle size, it being understood that the choice of aggregate and particle size will depend largely upon choice, in view of the ultimate use for which the product is intended.

Any suitable soft bitumen may be used in carrying out the method in accordance with this invention. Thus, for example petroleum still residue, heavy petroleum distillate, coal tar, pressure still tar, or the like, may constitute the soft bitumen. Desirably, though not necessarily, the soft bitumen from whatever source, will have a Furol viscosity not in excess of about 2000 seconds, or more specifically the soft bitumen may desirably have a Furol viscosity not in excess of about 1000 seconds, when tested at a temperature of 122° F. according to the standard method of test for viscosity of petroleum products, American Society for Testing Materials, Designation 30.

A satisfactory soft bitumen for many purposes may comprise, for example, a still residue or other type of soft bitumen having a Furol viscosity not in excess of about 1000 seconds when tested at a temperature of 122° F.

The volatile solvent for the soft bitumen may comprise any well known solvent for bitumen, which will perform the desired function, which is to reduce the viscosity of the soft bitumen in order to insure the effective coating of the aggregate with the soft bitumen with a desired thickness of coating. Thus, for example, the volatile solvent for the soft bitumen may comprise a light petroleum distillate, as gasoline, naphtha, etc., or other equivalent solvent for the bitumen.

The hard bitumen for use in accordance with this invention may be any suitable hard bitumen which is capable of dispersion in solid form throughout the mass of aggregate coated with soft bitumen and which will be capable of ultimate fluxing and coalescence by and with the soft bitumen for the formation of a binder for the aggregate of desired characteristics.

For example, the hard bitumen may be Trinidad asphalt, or a pyrobitumen, as Gilsonite. The hard bitumen will be used in solid form, as, for example, in powdered form, and may be prepared for use in any suitable manner, as by grinding or crushing.

In proceeding in accordance with this invention the several components of the mixture may be used in widely varying amounts and proportions. The total amount of hard and soft bitumen taken together and the proportion of soft bitumen to hard bitumen and the aggregate may be widely varied and will depend largely upon the ultimate purpose for which the product is intended and upon the characteristics desired for the product in any particular case. The solvent for the soft bitumen may be used in widely varying amounts, dependent upon the type and particle size or sizes of the aggregate and upon the particular soft bitumen used, more especially with respect to its normal viscosity, and upon the particular procedure used in carrying out the method. By way of example, the solvent for the soft bitumen may be used in amount say within about the range 10–20% by weight of the soft bitumen. As has been indicated, the function of the solvent or flux for the soft bitumen is to reduce the viscosity of the soft bitumen to insure uniform coating of the aggregate with the soft bitumen and desired thickness of coating. The solvent is ultimately lost from the product after laying and consolidation and hence does not increase the ultimate total bitumen content of the product, but rather acts as a temporary medium for insuring efficient coating of the aggregate with avoidance of the use of a soft bitumen of lower viscosity than would produce an efficient binder for the aggregate after fluxing or coalescence with the hard bitumen.

In proceeding in accordance with this invention, as has been indicated, the soft bitumen will be initially admixed with the aggregate in the form of an emulsion; that is to say, the soft bitumen will be emulsified in water. Any suitable form of emulsion produced in any well known manner may be used. By way of example, a suitable emulsion may be produced by gradually adding the soft bitumen in a molten condition, with agitation, to water containing a suitable emulsifying agent, as a soap, clay, or the like, in solution or suspension.

In practicing the method in accordance with this invention, as is indicated, the soft bitumen will be admixed with the aggregate in the presence of a solvent. The solvent may be introduced variously. Thus, for example, the soft bitumen may be cut back with the solvent and the cut back soft bitumen emulsified in water and the emulsion then admixed with the aggregate, the solvent may be added to the aggregate and admixed therewith to form a coating on the particles thereof and the soft bitumen then added to the mixture, the soft bitumen in the form of an emulsion may be admixed with the aggregate and the solvent then added, or the solvent may be added after admixture of the soft bitumen with the aggregate and addition and admixture of the hard bitumen. The solvent for the soft bitumen will act whenever it is added to reduce the viscosity of the soft bitumen and as a consequence causes an efficient coating of the aggregate with the soft bitumen. However, it will generally be preferable to cut back or dissolve the soft bitumen with the volatile solvent and emulsify the cut-back soft bitumen with admixture of the emulsion and the aggregate.

In proceeding, it will be desirable to admix the emulsion of soft bitumen, whether it contain the solvent or not, with the aggregate until the emulsion has broken before addition and admixture of the hard bitumen or its dispersion in the mass. Likewise, if the solvent be not added with the emulsified soft bitumen, it will desirably not be added until the emulsion is broken. Breaking of the emulsion may be effected by sufficient mixing with the aggregate. On the other hand, the breaking of the emulsion may be facilitated by the addition to the mix of some substance, as an electrolyte, effective to break the emulsion. Thus, the breaking of the emulsion may be facilitated by addition to the mixture of, for example, Portland cement, lime, a salt, or other substance well known to function to break bituminous emulsions. Where a substance is used facilitating the breaking of the emulsion, it may be used in widely varying and desired amount, but generally speaking any amount within say about the range 0.5–7.0% will be found effective.

In carrying out the method in accordance with this invention no particular form of apparatus is required, it being only necessary to provide some means for admixing the various components. The method may be efficiently carried out and a satisfactory product produced with the use of any standard form of mixer, as, for example, a pug mill.

As generally illustrative of the practical adaptation of the method in accordance with this invention for production of the product, for example, a soft bitumen is selected and cut back with say from 10–20% of petroleum naphtha. The cut back soft bitumen is then emulsified in water to any desired concentration, say 25–70% of soft bitumen exclusive of the solvent. A selected aggregate is then introduced into a pug mill and the emulsion added and admixed with the aggregate.

The mixing is continued until the emulsion has broken and the aggregate has become substantially uniformly covered with the cut back soft bitumen. If desired, say 2–10% of Portland cement may be added to the mixture to facilitate and expedite the breaking of the emulsion. The aggregate having broken and the emulsion having become substantially uniformly coated with the soft bitumen, the hard bitumen, for example, Gilsonite, having been reduced to a powder by suitable grinding, is added to the mixture and dispersed through the mass of coated aggregate. The mixture is then complete and may be discharged from the mixer. The mix having been discharged from the mixer may be transported to a point where it is to be laid, or may be kept in storage for a substantial period without loss of the granular, friable nature which it will be found to possess.

As more specifically illustrative of the practical adaptation of the method of this invention for the production of a product which will be found adaptable for use as a paving or surfacing mixture for roads, for example, about 50 pounds of a petroleum still residue having a Furol viscosity of say about 2000 seconds at 122° F. is cut back with about 15% of petroleum naphtha. The cut back residue is then emulsified in water containing a soap in solution to a soft bitumen concentration of about 60%. The emulsion is then added to a pug mill containing about 780 pounds of bar sand and 55 pounds of limestone dust. The sand and emulsion are admixed until the emulsion has broken, or say 2% of Portland cement may be added to expedite the breaking of the emulsion, and the particles of sand are substantially uniformly coated with the cut back residue. 80 pounds of powdered Trinidad asphalt are then admixed with the coated sand until the powdered Trinidad asphalt is substantially uniformly distributed throughout the mass of coated aggregate. The mixture is then finished and is discharged from the mixer.

In the above specific illustration, it will be understood that other forms of soft bitumen and soft bitumen of different viscosity may be used. Likewise, volatile solvents for the soft bitumen other than petroleum naphtha may be used, as may also various other hard bitumens, as Gilsonite, etc., for the Trinidad asphalt, and other aggregates or mixtures of aggregates for the bar sand. It will be understood that the quantities and proportions of the various ingredients of the mix may be widely varied from those given above by way of specific illustration.

The mixture prepared in accordance with the above illustration will be found to be of a granular, friable nature. The powdered Trinidad asphalt will be only slowly fluxed by the cut back still residue in view of its inherent resistance to fluxing and to the presence in the mixture of the moisture or water of the emulsion. As a consequence, the mixture will retain its granular, friable nature during relatively long periods of storage and due to its granular, friable nature may be readily distributed and levelled in the process of laying. On the other hand, when the mixture is laid and consolidated in any usual manner, as by tamping or rolling, the moisture and solvent for the still residue, will be lost with relative rapidity, and due to the consolidation the still residue, aided somewhat by the solvent so long as it is present, will more rapidly flux the Trinidad asphalt and a homogeneous, durable, bituminous binder for the aggregate will be formed.

It will now be appreciated that in accordance with the method embodying this invention the admixture of a soft bitumen and a hard bitumen in solid form, and aggregate will be effected in the presence of a volatile solvent for the soft bitumen, the presence of which will insure the substantially uniform coating of the aggregate with the soft bitumen, without reducing the viscosity of the ultimate combination of the soft and hard bitumens, and especially under conditions resistant to uniform coating, such as where the small particles of the aggregate tend to strip the soft bitumen from the large particles due to scouring in the mixer.

It will be understood that the product in accordance with this invention comprises an aggregate coated with a soft bitumen cut back with a solvent and having moisture, or water, and a hard bitumen in solid form distributed throughout the mass.

What I claim and desire to protect by Letters Patent is:

1. The method of producing a bituminous paving mixture which includes admixing an aggregate with an aqueous emulsion of a soft bitumen until the emulsion is broken and after the emulsion has broken admixing the aggregate with a hard bitumen in solid form in the presence of a volatile solvent for the soft bitumen.

2. The method of producing a bituminous paving mixture which includes admixing an aggregate with an aqueous emulsion comprising a soft bitumen and a volatile solvent therefor dispersed in internal phase in water, breaking the emulsion and when the aggregate is coated with the soft bitumen admixing with the coated aggregate a hard bitumen in powdered form.

3. The method of producing a bituminous paving mixture which includes admixing an aggregate with an aqueous emulsion comprising a soft bitumen dispersed in internal phase in water, adding to the mix a substance adapted to break the emulsion and when the emulsion is broken adding a hard bitumen in powdered form and continuing the mixing in the presence of a volatile solvent.

4. A paving mixture including an aggregate, a soft bitumen, a volatile solvent, a hard bitumen in powdered form and water, said mixture being characterized by the fact that the powdered bitumen is dispersed in the water.

5. A granular paving mixture including an aggregate coated with a soft bitumen by the breaking of an aqueous emulsion of soft bitumen, a volatile solvent, a hard bitumen in powdered form and water, the mixture being characterized by the fact that the powdered bitumen and the water are dispersed in the mass without substantial coalescence of the hard and soft bitumen.

6. The method of producing a bituminous paving mixture which includes admixing an aggregate with an aqueous emulsion of a soft bitumen, breaking the emulsion to effect coating of the aggregate with the soft bitumen, adding a volatile solvent for the soft bitumen to the coated aggregate, then admixing a powdered hard bitumen with the coated aggregate.

7. The method of producing a bituminous paving mixture which includes admixing an aggregate with an aqueous emulsion of a soft bitumen, breaking the emulsion to effect coating of the aggregate with the soft bitumen, admixing with the coated aggregate a hard bitumen in powdered form and adding to and admixing with the mixture a volatile solvent for the soft bitumen.

8. The method of producing a bituminous paving mixture which includes admixing an aggregate and a volatile solvent for soft bitumen, adding an aqueous emulsion of soft bitumen to the mixture and continuing the mixing until the emulsion is broken and after the emulsion has broken adding a powdered hard bitumen and admixing.

9. A granular paving mixture including an aggregate coated with a soft bitumen by the breaking of an aqueous emulsion of soft bitumen, a volatile solvent, a hard bitumen in powdered form, a filler and water, the mixture being characterized by the fact that the powdered bitumen, the filler and the water are dispersed in the mass without substantial coalescence of the hard and soft bitumen.

10. The method of producing a bituminous paving mixture which includes admixing, in the presence of a volatile solvent for the soft bitumen, an aggregate, an aqueous emulsion of soft bitumen and a hard bitumen in solid form and causing the emulsion to break in effecting the admixing.

PRESTON R. SMITH.